United States Patent

Cain et al.

[11] Patent Number: 5,431,948
[45] Date of Patent: * Jul. 11, 1995

[54] BLOOM-INHIBITING FAT BLENDS

[75] Inventors: Frederick W. Cain; Neil G. Hargreaves, both of Voorburg; Adrian D. Hughes, The Hague, all of Netherlands

[73] Assignee: Loders Croklaan B.V., Wormerveer, Netherlands

[*] Notice: The portion of the term of this patent subsequent to Jun. 28, 2011 has been disclaimed.

[21] Appl. No.: 65,718

[22] Filed: May 21, 1993

[30] Foreign Application Priority Data

| May 22, 1992 | [EP] | European Pat. Off. | 92201472 |
| Sep. 30, 1992 | [EP] | European Pat. Off. | 92203001 |
| Dec. 3, 1992 | [EP] | European Pat. Off. | 92203754 |
| Dec. 23, 1992 | [EP] | European Pat. Off. | 92204077 |

[51] Int. Cl.$^6$ .................... A23D 9/00; A23D 9/06
[52] U.S. Cl. .................... 426/607; 426/606; 426/660; 426/98; 426/99
[58] Field of Search ........... 426/606, 607, 660, 99, 426/98

[56] References Cited

U.S. PATENT DOCUMENTS

| 4,486,457 | 12/1984 | Schijf et al. | |
| 4,726,959 | 2/1988 | Momura | 426/610 |
| 4,877,636 | 10/1989 | Koyano | 426/610 |
| 5,023,106 | 6/1991 | Ehrman | 426/610 |
| 5,135,769 | 8/1992 | Itagaki | 426/610 |
| 5,215,780 | 6/1993 | Meidenbauer | 426/607 |
| 5,271,950 | 12/1993 | Yamaguchi | 426/607 |
| 5,288,513 | 2/1994 | Cain | 426/660 |
| 5,324,553 | 6/1994 | Cain | 426/607 |

FOREIGN PATENT DOCUMENTS

| 0426155 | 5/1991 | European Pat. Off. . |
| 0503694 | 9/1992 | European Pat. Off. . |
| 0354025 | 2/1993 | European Pat. Off. . |

OTHER PUBLICATIONS

Swern 1979 Bailey's Industrial Oil And Fat Products vol. 1, 4th edition John Wiley & Sons New York pp. 30–31.
European Search Report in European Patent Application 92201472.5.
Abstract of JP 56058445—vol. 5, No. 120, Aug. 4, 1981.
Abstract of JP 62006635—vol. 11, No. 184, Jun. 12, 1987.
Abstract of JP 4075593—vol. 16, No. 289, Jun. 26, 1992.
Abstract of JP 1120250—vol. 13, No. 362, Aug. 14, 1989.

*Primary Examiner*—Carolyn Paden
*Attorney, Agent, or Firm*—Cushman Darby & Cushman

[57] ABSTRACT

Blends of triglyceride compositions A, and B and/or C, wherein

A is a triglyceride composition of the ($H_2M+M_2H$)-type,
H = saturated fatty acid $\geq C_{16}$,
M = saturated fatty acid $C_8$–$C_{14}$, while preferably the $$\frac{C_{40}-C_{46}}{C_{30}-C_{38}}$$

ratio of components herein ranges from 1–20,
B = triglyceride composition relatively high in ($U_3+U_2S$) triglycerides
U = unsaturated fatty acid,
S = saturated fatty acid and
C = vegetable fat with an $N_{20}$ (not stab.) > 15, containing preferably high amounts of SUS triglycerides.

are novel and display excellent anti-bloom behavior at ambient temperatures.

51 Claims, No Drawings

BLOOM-INHIBITING FAT BLENDS

As set out in our co-pending European Patent Application 91 30 60 26.5 (filed Jul. 3, 1991), chocolate compositions containing the conventional ingredients, such as cocoa powder, cocoa butter, cocoa-butter equivalents, sugar and emulsifiers, need to be tempered because of the presence of polymorphic fats, such as POP, POSt and/or StOSt (P=palmitic acid; St=stearic acid and O=oleic acid).

BACKGROUND OF THE INVENTION

According to the above-mentioned patent application an improvement in bloom formation is obtained by adding a minimum amount of a hardstock fat to the chocolate composition. The hardstock fats used are of the ($H_2M+M_2H$)-type, wherein H=saturated fatty acid having at least 16 C-atoms and M=saturated fatty acid having $C_8$–$C_{14}$ atoms, preferably $C_{12}$–$C_{14}$ atoms. Very useful are hardstock fats obtainable by interesterification of mixtures of vegetable oils high in triglycerides with fatty acid residues having at least 16 C-atoms, and triglycerides rich in lauric and/or myristic acid residues, e.g. as disclosed in our Australian Patent Application 12346/85 (Ser. No 549,465).

Although the results obtained according to the above-mentioned European Patent Application are, in general, very satisfactory, in particular upon storage above ambient temperature, we found that bloom formation still occurred upon storage at ambient temperature when these hardstock fats were applied at relatively high levels, i.e. above 1.5 wt.% on product, in particular in dark chocolate compositions. It has, however, been found that the prevention of bloom at high temperatures is most effective when more of the additive is applied.

SUMMARY OF INVENTION

Therefore, we have conducted a study in order to find out how this problem could be overcome. As a result, we have found a new blend of triglycerides which upon application in chocolate compositions, or in chocolate-like compositions, wherein high amounts of cocoa butter equivalents are present, or in baked bakery products, provided with a chocolate layer or a chocolate-like layer, or in chocolate encapsulated filling led to an improvement of the anti-bloom behavior of the chocolate compositions. So our invention concerns in the first instance novel triglyceride compositions, comprising triglycerides from the types A and B and/or C, wherein A is a triglyceride composition of the ($H_2M+M_2H$)-type, as defined above; B is a soft triglyceride composition, having a relatively high level of ($U_3+U_2S$)-triglycerides and C is a vegetable fat or a fraction thereof with an $N_{20}$ (not stab.) of more than 15. Under above definition blends of A and B; A and C and A, B and C are covered.

Depending on the typical use of the triglyceride compositions we can define different triglyceride compositions, each of which is specifically adapted for its typical use.

So, if the compositions should be used in chocolate compositions, based on the presence of cocoa butter as its main fat component our novel blends of triglycerides comprise triglyceride compositions A, B and C in amounts of:

5–80 wt.%, preferably 20–60 wt.% of A;
10–80 wt.%, preferably 20–60 wt.% of B;
0–70 wt.%, preferably 20–50 wt.% of C,
wherein
A is a triglyceride composition of the ($H_2M+M_2H$)-type as defined above, wherein the weight ratio of components having 40–46 C-atoms: components having 30–38 C-atoms (so $$\frac{C_{40}-C_{46})}{C_{30}-C_{38}}$$

=1–20, preferably 2–10;

B is a soft triglyceride composition, in particular a liquid oil having a content of ($U_3+U_2S$)-triglycerides of at least 45 wt.%, preferably at least 60 wt.%, and C is a triglyceride composition having a SUS content of at least 45 wt.% preferably at least 60 wt.%, wherein U=cis- or trans-, mono- or polyunsaturated fatty acid having at least 18 C-atoms, in particular oleic acid, and S=saturated fatty acid having 16–22 C-atoms, in particular 16–18 C-atoms.

The above-mentioned blends can be used as such as the fat phase of chocolate compositions or as additive for the fat phase of such chocolate compositions, the prerequisite in both instances being that the fat phase of the chocolate composition should contain 1–25 wt.% of the above-mentioned blend of A, B and C, preferably 10–20 wt% while this fat phase should at the same time comprise at least 15 wt.% of a SUS component, either originating from the above-mentioned blend or added per se as cocoa butter or cocoa-butter equivalent.

The ($H_2M+M_2H$)-type composition A is preferably obtained from interesterification of vegetable oil high in triglycerides with fatty acid residues having at least 16 C-atoms (in particular hardened palm oil, such as PO-58) and triglycerides rich in lauric and/or myristic acid residues (in particular hardened palm kernel oil, such as PK-39). In case this is suitable the product is obtained as stearin fraction from a fractionation of the interesterification product.

Component B of the fat blend according to the invention is a soft triglyceride composition, in particular a liquid oil having a content of ($U_3+U_2S$) triglycerides of at least 45 wt.%, in particular 60–85 wt.%. Examples of such triglyceride compositions are vegetable oils, such as groundnut oil, soybean oil, sunflower oil or rapeseed oil, olein fractions from vegetable oils or olein fractions of transhardened fats or high-stability oils.

Suitable compositions are, for instance, disclosed in our European Patent Application 91200516.2 and European Patent Application 91305462.3. A very suitable soft triglyceride composition is the olein fraction from the fractionation of palm oil. It is, however, also possible to apply olein fractions from animal fat sources, such as butterfat- or lard olein.

Component C of the blend can be absent, in which case the blend only consists of components A and B. In that case, however, component C must be added to the chocolate composition itself since at least 15 wt.% of SUS must be present in the fat phase of the chocolate composition. Therefore, it is preferred that component C be present in the blend according to the invention. The maximum amount of C in the blend is 70 wt.% so that a blend can be provided wherein enough material of components A and B is present to obtain the required effect.

Suitable examples of triglyceride composition C are: cocoa butter or fractions thereof, shea stearin, palm oil mid-fractions or illipe. Also enzymically made cocoa-butter equivalents can be used. It is preferred to use a component C that has a content of trisaturated triglycerides of less than 5 wt. %, in particular less than 3 wt. %.

The best effects are obtained by adding the blends to dark chocolate compositions. The invention further comprises chocolate bars and chocolate-coated confectionery products, in particular those made from dark chocolate, wherein the chocolate composition comprises an effective amount of the blends of A, B and C according to the invention.

Another aspect of the invention concerns the use of a blend of compositions A, B and C according to the above invention in chocolate compositions wherein this blend is used to improve the anti-bloom behavior of a chocolate composition upon storage at ambient temperatures (i.e. temperatures up to 35° C.), compared with a system that contains no ($H_2M+M_2H$)-type fat.

In the instance that the triglyceride compositions should be applicable in systems, wherein all or substantially all of the cocoa butter can be replaced by a cocoa butter equivalent (so: in chocolate-like compositions), we have found which blends of triglycerides fulfill the requirements that make them suitable as fats, which can be used at high levels of incorporation in chocolate-like materials. In that case, our invention concerns a blend of triglyceride compositions A, B and C comprising:

2-40 wt. %, preferably 2-15 wt. % of A;
0.5-40 wt. %, preferably 2-20 wt. % of B;
60-97.5 wt. %, preferably 70-96 wt. % of C,
wherein
  A is the same triglyceride composition of the ($H_2M+M_2H$)-type, as mentioned above.
  B is a similar soft triglyceride composition, in particular liquid oil as defined above, however, having a content of ($U_3+U_2S$)-triglycerides of at least 30 wt. %, preferably at least 60 wt. %, and
  C is a similar triglyceride composition as defined above, however, having an SUS content of at least 30 wt. %, preferably at least 40 wt. %, Component C of this blend must be present in the blend in amounts of at least 60 wt. %, preferably at least 70 wt. % The maximum amount of C in the blend is 97.5 wt. % so that a blend can be provided wherein enough material of components A and B is present to obtain the required effect.

Suitable examples of triglyceride composition C are: cocoa butter or fractions thereof, shea stearin, palm oil mid-fractions or illipe. It is preferred to use a component C that has a content of trisaturated triglycerides of less than 5 wt. %, in particular less than 3 wt. %.

The invention further comprises bars and coated confectionery products wherein the chocolate-like composition comprises effective amounts of the blends of A, B and C according to this latter invention, effective amounts being 5-100 wt. % of the fat component of the composition.

Another aspect of the invention concerns the use of this last blend of compositions A, B and C in chocolate-like compositions low in cocoa butter wherein this blend is used to improve the anti-bloom behavior of the composition upon storage at ambient temperature, compared with a system that contains no ($H_2M+M_2H$)-type fat.

As another alternative we found that problems related with the occurrence of bloom formation in chocolate or chocolate-like coatings of baked bakery products could also be overcome by the application of compositions according to the invention. In these case we found, however, that an additional problem had to be solved: while the problems, related with the bloom formation could be overcome by the use of mixtures of A and B, we found that the application of these mixtures did not always provide the highly functional doughs that we aimed for. We found that in those cases highly functional doughs could be obtained by incorporation of a fat component C with a minimum $N_{20}$-value (not stabilized) of 15. The application of such fat components C also provided, that we could apply fractions of the fat component A, such as the olein fraction thereof, so that more flexibility in our fat compositions was possible.

Baked bakery products, such as biscuits, cookies or cakes, are often provided with a chocolate layer (or a chocolate-like layer based on a cocoa butter equivalent). This layer can completely encapsulate the baked product or can be present as a coating, not completely encapsulating the baked product.

As the chocolate or chocolate-like layer is based on polymorphic fats high in SUS-type triglycerides (S=sat. $C_{16}$–$C_{18}$; U=mainly $C_{18:1}$), storage of the products often led to bloom formation on the chocolate(-like) layer.

DETAILED DESCRIPTION OF INVENTION

In our Australian Patent Application 19,379/92 we already disclosed fat compositions that could be applied to prevent bloom in the chocolate(-like) layers of encapsulated fillings. A possible filling is a biscuit or a cookie, while Example VI of this Australian Patent Application illustrates the preparation of a biscuit which is enrobed by a chocolate composition containing 75 wt. % of palm oil olein and 25 wt. % of a fat having about 70 wt. % of ($H_2M+M_2H$).

We have now found new fat compositions that can display an effect similar to that disclosed in the above-mentioned Australian Patent Application, even if the baked product is not encapsulated in a chocolate(-like) layer but is provided with a coating of chocolate(-like) material that does not completely encapsulate the baked product. Simultaneously these fat compositions lead to high functional doughs, wherein all kind of fats A can be applied. These compositions contain ($H_2M+M_2H$)-triglycerides.

The ($H_2M+M_2H$) fat present in the fat phase of the dough from which the baked product is made migrates to the chocolate(-like) layer and acts there as an anti-bloom agent. It is, however, also possible to add the fat composition immediately to the chocolate composition from which the chocolate(-like) layer is made.

Therefore, the invention concerns a fat composition suitable for the preparation of non-blooming chocolate-coated, baked bakery dough products comprising fats A, B and/or C, wherein:
  fat A=fat rich in ($H_2M+M_2H$) triglycerides, H=saturated fatty acid having $\geq C_{16}$, preferably M=saturated fatty acid having $C_8$–$C_{14}$, preferably $C_{12}$–$C_{14}$,
  fat B=fat containing at least 35 wt. % ($U_3+U_2S$), U=mono- or polyunsaturated fatty acid having $\geq C_{18}$, preferably all cis, S=saturated fatty acid having $\geq C_{16}$, preferably $C_{16}$–$C_{22}$, fat C = vegetable fat or a fraction thereof, displaying an $N_{20}$ (non-stab.) of more than 15, fat A being present in amounts of 5.5–95 wt. %, preferably 20–60 wt. %, more preferably 30–55 wt. %, fat B being present in amounts of 0–94.5 wt. %, preferably 30–80 wt. %, fat C being present in amounts of 0–94 5 wt % preferably 5–40 wt. %, the amount of (B+C) being always more than 0% and the combination of 75 wt. % of wet-fractionated palm oil olein (as fat B) and 25 wt. % of a fat A having 70 wt. % of ($M_2H+MH_2$) being excluded.

Fat A suitably is selected from the group consisting of:

a) interesterified mixture of vegetable oil high in triglycerides with fatty acid residues having at least 16 C atoms and vegetable triglycerides rich in lauric and/or myristic acid residues;

b) stearin fractions of the fractionation of fats a) above;

c) mid-fractions of the fractionation of fats a) above;

d) olein fractions of the fractionation of fats a) above;

e) mixtures of fractions a, b, c and/or d above.

The interesterified mixture a) above preferably displays a weight ratio $C_{42} : C_{36}$ (=triglyceride with 42, respectively, 36 C atoms) of 2.0–5.0. Examples of such interesterified mixtures are given in the above-mentioned Australian Patent Application 19,379/92.

It is, however, also possible to apply fractions of the above-mentioned mixtures. Very suitable fat compositions are obtained when the fat composition contains, as fat A, a stearin fraction displaying a $$\frac{C_{42}}{C_{36}}$$

of more than 7.0.

However, also application of the mid-fraction with $$\frac{C_{42}}{C_{36}} = 5.0 - 7.0$$

or of the olein fraction with $C_{42} : C_{36}$ = less than 2.0 leads to very acceptable results.

The only prerequisite for fat A is that its ($H_2M+M_2H$) content is 20–100 wt % preferably 40–85 wt %

In the fats A rich in ($H_2M+M_2H$) triglycerides, the triglyceride distribution is such that ($C_{40}$–$C_{46}$) : ($C_{30}$–$C_{38}$) is between 0.8 and 15, preferably between 1 and 10.

Fat B is a liquid oil suitably selected from the group consisting of sunflower oil, rapeseed oil, soybean oil, arachidic oil, palm oil olein, high oleic sunflower oil, high oleic rapeseed oil, with preferably a ($U_2S+U_3$) content of more than 45 wt. %. Mixtures thereof can, of course, also be applied.

Fat C is either a hardened vegetable fat, a fraction thereof or a fraction of an unhardened vegetable fat.

Very suitable fats C are hardened vegetable fats or fractions thereof having a melting point of 25°–55° C., such as hardened palm oil olein-37, hardened palm oil-44, hardened soybean-36, a mid-fraction of a hardened mixture of soybean oil and cottonseed oil.

However, also fractions of unhardened vegetable oils, which fractions have a SUS content of more than 35 wt % preferably more than 60 wt. %, can be successfully applied.

A preferred fat C is palm oil stearin. The $N_{20}$ value (nonstab., i.e. measured after the following T regime: melt at 80° C.; keep at 60° C. for 10 minutes, at 0° C. for 1 hour and at 20° C. for 30 minutes [=measurement temperatures]) of fat C is preferably more than 25, more preferably more than 40.

The N line of the total fat composition (so consisting of the blend of fats A, B and/or C) is preferably (not stabilized): $N_{20}$=15–55, more preferably 20–45, and $N_{30}$=2–30, more preferably 4–15.

Since margarines or spreads are applied in many dough preparations for baked bakery products, the invention is also concerned with water-in-oil emulsions containing 20–85 wt. % of fat and wherein the fat is a fat according to this last invention. These emulsions can be made using well-known techniques (cf., e.g., fat-continuous microvotator processing or inversion processing).

The baked bakery products, at least partly coated with a chocolate or chocolate-like material, wherein the fat phase of the dough from which the baked product was made at least partly consists of the fat composition according to the invention or of the water-in-oil emulsion according to the invention, are also part of the invention.

The ($H_2M+M_2H$) level of the fat phase of the dough phase of the baked product is 5–80 wt. % preferably 10–40 wt. %.

In another embodiment of the invention we have found that problems, occurring on chocolate-encapsulated fillings can also be overcome by applying the compositions of our invention. In fact we found, that a problem similar to the problem for the dough fats had to be overcome. I.e. to come to a fat composition that displays a high quality performance when applied in fillings and which enables the application of several types of fats A.

Chocolate-encapsulated fillings consisting of at least a filling and a chocolate or chocolate-like coating, wherein the filling comprises conventional filling ingredients, such as sugar, skimmed milk powder, salt or emulsifier and at least 25 wt. % of a filling fat, are well-known products. So far, however, these products have displayed a big disadvantage, in particular when the filling is liquid, i.e. fat present in the liquid filling migrates into the coating layer. Because of this migration, blooming of the chocolate occurs.

In order to overcome this problem, a solution was sought in the use of an intermediate layer between the liquid filling and the coating. However, such an extra layer complicates the production process and often has a negative influence on the mouthfeel of the product.

We have found that it is possible to avoid the necessity of such an extra layer, while the product properties are as good or even better by applying the fat compositions according to the invention. Application of these fat composition leads to a high-quality product performance and enables also the use of different types of fats A in our products.

From U.S. Pat. No. 2,979,401 stabilizing ingredients for solid chocolate materials or chocolate-coated products are known that are included in the chocolate in amounts of 0.5–5 wt. %. The stabilizing ingredients consist of triglycerides of lauric, myristic and palmitic acid, preferably in molar ratios of 2.0:1.2:2.0. Minor amounts of other fatty acids do not change the basic character of the ingredients. The ingredients are used to stabilize the color of chocolate upon storage. Because of the very strict requirements set to the fatty acid components of the triglycerides that may be used, these products have never been applied commercially.

From U.S. Pat. No. 3,491,677 it is further known that bloom formation can be inhibited by utilization of fatty compositions that are mixtures of natural interesterified triglycerides comprising short-chain fatty acids and long-chain fatty acids while the iodine value (=I.V.) of the compounds is 30–55 and the melting point is low. As a consequence of the above-mentioned requirements, only a limited range of triglycerides could be applied while the low melting point may create problems as regards the properties of the chocolate composition.

From EP 394,408 triglyceride compositions are known that contain high levels (at least 85%) of combined MLM and MML (M=saturated fatty acid $C_8$–$C_{10}$; L=saturated fatty acid $C_{20}$–$C_{24}$) and low levels (i.e. at most 10 wt. %) of triglycerides LLM and LML (combined). These fats should always contain $C_8$ and $C_{10}$ fatty acid residues (35–60 wt. %) in a ratio of 1:4 to 4:1, while also 35–60 wt. % of behenic acid should be present. Minor amounts of $C_{12}$–$C_{18}$ fatty acids can be present in the fats.

The fat phase comprising the above-mentioned triglycerides should contain less than 20 wt. % of cocoa butter (i.e. less than 15 wt. % of SUS; S=saturated $C_{16}$/$C_{18}$; U=oleic). The triglycerides are applied in order to reduce the caloric value of compositions normally containing cocoa butter by replacing cocoa butter by these mixed triglycerides.

We have now found that the problems associated with the application of the prior art products can be solved by using a specific filling fat for use in the fully or partially encapsulated filling.

Therefore, the invention concerns a fat composition suitable for the preparation of non-blooming chocolate-coated, confection products, comprising fats A and C and optionally B, wherein:

fat A = fat rich in ($H_2M$+$M_2H$) triglycerides, H=saturated fatty acid having $\geq C_{16}$, preferably $C_{16}$–$C_{18}$, M=saturated fatty acid having $C_8$–$C_{14}$, preferably $C_{12}$–$C_{14}$, fat B = fat containing at least 35 wt. % ($U_3$+$U_2S$), U=mono- or polyunsaturated fatty acid having $\geq C_{18}$, preferably all cis, S=saturated fatty acid having $\geq C_{16}$, preferably $C_{16}$–$C_{22}$, fat C = vegetable fat or a fraction thereof, displaying an $N_{20}$ (non-stab.) of more than 15, fat A being present in amounts of 5.5–95 wt. %, preferably 20–60 wt. %, more preferably 30–55 wt. %, fat B being present in amounts of 0–89.5 wt. %, preferably 30–80 wt. %, fat C being present in amounts of 5–94.5 wt % preferably 20–60 wt. %, Fats A, B and C that can be applied are the same fats as described for the application for the preparation of the baked bakery product.

The N line of the total fat composition (so consisting of the blend of fats A, B and/or C) is preferably (not stabilized): $N_{20}$=10–75 more preferably 20–45, and $N_{30}$=0–20, more preferably <18.

Although the fat compositions preferably are applied as part of the filling of an encapsulated filling, it is also possible that the fat compositions are applied as part of the fat phase of the encapsulation.

EXAMPLES 1–4

Fat blends of the compositions according to Table I were added to the fat phase of a conventional dark chocolate base material so that the fat phase contained 15 wt. % of the different blends.

TABLE I

| Example | 1 | 2 | 3 | 4 |
|---|---|---|---|---|
| Blend added | 100% C | 40% A<br>60% C | 60% B<br>40% C | 40% A<br>40% B<br>20% C |

The occurrence of bloom formation was assessed for each of the compositions, either after 1 month at 20° C. or after 1 month 12 hours' cycle at 20°/32° C. The results are given in Table II.

TABLE II

| Example | 1 | 2 | 3 | 4 |
|---|---|---|---|---|
| 1 month at 20° C. | No bloom | Bloom | No bloom | No bloom |
| 1 month at 20/32° C. | Bloom | No bloom | Bloom | No bloom |

Accordingly, the composition according to Example 4 led to the best results.

The origin and/or the composition of fats A, B and C used, are mentioned below:

A: Mid-fraction of an ($H_2M$+$M_2H$)-fat of the following composition: $C_{12}$=26.5%; $C_{14}$=9%; $C_{16}$=21%; $C_{18:0}$=38%; $C_{30}$–$C_{38}$=8.1; $C_{40}$–$C_{46}$=61.4. Ratio:

$$\frac{C_{40}-C_{46}}{C_{30}-C_{38}} = 7.58$$

B: Olein fraction from the wet fractionation of palm oil (% $U_2S$+$U_3$=72%).

C: Cocoa butter ($N_{20}$, n.s.=58).

EXAMPLE 5

Bars were made from chocolate-like compositions. The following recipe was used therefor:

| | wt. % |
|---|---|
| Icing sugar | 52.5 |
| Cocoa powder | 6.0 |
| Cocoa liquor | 6.0 |
| Fat | 29.0 |
| Lecithin | 0.5 |
| Flavour | 0.02 |
| Skimmed milk powder | 6.0 |

Two different fats were applied, i.e.

Fat I: a mixture of 70 wt. % of palm mid-fraction and 30% of shea stearin.

Fat II: a mixture of 6.9 wt. % of a blend of 15% of illipe; 35% of shea stearin and 50% of palm oil mid-fraction;

6.9 wt. % of a hardstock with the composition: $C_{12}$=26.5%; $C_{14}$=9%; $C_{16}$=21%; $C_{18:0}$=38%; $C_{30}$–$C_{38}$=8.1; $C_{40}$–$C_{46}$=61.4.

$$\text{Ratio:} \frac{C_{40}-C_{46}}{C_{30}-C_{38}} = 7.58$$

82.75 wt. % of a blend of 70 wt. % of palm oil mid-fraction and 30 wt. % of shea stearin;

3.45 wt. % of a wet-fractionated palm oil olein.
$N_{20}$ (n.s.) for CBF part of fat II = 33.

The compositions were slab-tempered and bars were moulded.

Results After 1 Month' Storage
At a 12 hour-cycle regime at 20°/32° C.:
Fat I: Bloom unacceptable after 1 week (score 1);
Fat II: Bloom very good after 1 month (score 4).
At 20° C.:
Fat I: Excellent (score 5);
Fat II: Excellent (score 5).
1 = unacceptable
5 = excellent
Results After 6 Months
At 20° C. both samples excellent (score 5).
At 25° C. both samples excellent (score 5).
At 20°/32° C.
Fat I: bloom after 1 week;
Fat II: bloom score 3–4.

EXAMPLE 6

6.1 Biscuits were made according to the following recipe:
Zeeuws flour 100%
Castor sugar 25%
Shortening samples 30%
Skimmed milk powder 5%
Salt 1%
Baking powder 1%
Water 22%

6.2 Shortenings were made in a microvotator, using the following fat blends:

| Fat Blend | Fat A ($M_2H + MH_2$) | Palm oil olein (= fat B) | Hardened palm oil olein (= C) |
|---|---|---|---|
| Bl-1 | — | 70 | 30 |
| Bl-2 | 10 | 70 | 20 |
| Bl-3 | 20 | 70 | 10 |
| Bl-4 | 25 | 70 | 5 |
| Bl-5 | 30 | 70 | — |

In each case, fat A was a stearin fraction of an interesterified mixture of hardened palm oil and hardened palmkernel oil. It displayed a $C_{42}:C_{36}$ weight ratio of 8.5 and contained 75 wt. % of ($H_2M+M_2H$). The ($C_{40}$–$C_{46}$):($C_{30}$–$C_{38}$) was 10.

The palm oil olein (fat B) contained 75 wt. % of ($U_2S+U_3$). The hardened palm oil olein had an $N_{20}=73$ (non-stab.) and an ($H_2M+M_2H$) level of far less than 5%.

6.3 Preparation of the dough and biscuits
The doughs were prepared according to the recipe described above. 500 g dough portions were made, using the procedure:
1. The sugar, margarine, milk powder and salt were fed into a horizontal z-blade high-speed mixer and mixed for 3 minutes.
2. The flour was added and mixed for a further 3 minutes.
3. The baking powder was dissolved in the water and then added to the above-mentioned mixture. The resulting product was stirred for 7 minutes.
4. The dough was then left to stand for 10 minutes, rolled out until 2 mm thick and then pricked.
5. The biscuits were cut from the dough and placed on a perforated plate. The biscuits were baked for 12 minutes at 200° C. 6.4 Preparation of chocolate The dark chocolate (Callebaut)+2% of cocoa butter (calculated on the product) were melted and tempered in a Kreuter tempering machine.

6.5 Enrobing of the biscuits
The biscuits were enrobed at 35° C. and cooled in a cooling tunnel, using compartment temperatures of 16° C., 16° C. 16° C.; the residence time was 10 minutes.

6.6. Storage conditions
After one night on the table, the enrobed biscuits were stored at 13° C., 20° C., 25° C. and 30° C. The bloom and gloss of the chocolate coating were evaluated.

6.7 Results
Results of Bloom and Gloss Measurements
Gloss measurements after 1 week.

| Dough fat | 13° C. | 20° C. | 25° C. | 30° C. |
|---|---|---|---|---|
| BL-1 | 5 | 5 | 2 | 2 |
| BL-2 | 5 | 5 | 3 | 3 |
| BL-3 | 5 | 5 | 5 | 4/5 |
| BL-4 | 5 | 5 | 5 | 4/5 |
| BL-5 | 5 | 5 | 5 | 4/5 |

Scale
5 - very good
4 - good
3 - acceptable
2 - poor
1 - very poor

| Fat bloom measurements after 2 weeks | | | | |
|---|---|---|---|---|
| Dough fat | 13° C. | 20° C. | 25° C. | 30° C. |
| BL-1 | 5 | 4/5 | 2 | 3 |
| BL-2 | 5 | 5 | 4 | 4 |
| BL-3 | 5 | 5 | 5 | 4 |
| BL-4 | 5 | 5 | 5 | 5 |
| BL-5 | 5 | 5 | 5 | 5 |

Scale
5 - no bloom
4 - very slight fat bloom (under microscope)
3 - beginning of fat bloom
2 - serious fat bloom
1 - uniform layer of white fat over the chocolate

EXAMPLE 7

7.1 Example 6 was repeated; however, the shortenings were made of the following fat blends:

| Fat Blend | Fat A' ($M_2H + MH_2$) | Palm oil olein (= fat B) | Hardened palm oil olein (= C) |
|---|---|---|---|
| Bl-6 | — | 70 | 30 |
| Bl-7 | 30 | 70 | — |
| Bl-8 | 60 | 40 | — |
| Bl-9 | 50 | 20 | 30 |

In Bl-7, fat A' was an interesterified mixture of hardened palmkernel and hardened palm oil (weight ratio 70:30). It displayed a $C_{42}/C_{36}$ ratio = 2.5.

In blends 8 and 9, fat A' was the olein fraction of the wet fractionation of the above-mentioned fat A' of blend 7. This olein fraction displayed a $C_{42}/C_{36}$ ratio = 1.5.

Fats B and C are identical with B and C of Example 6.

7.2 Results

| Gloss measurements after 1 week: | Gloss after 3 months: |
|---|---|

-continued

| | 13° C. | 20° C. | 25° C. | 13° C. | 20° C. | 25° C. |
|---|---|---|---|---|---|---|
| BL-6 | 4 | 3/4 | 1/2 | 4 | 1 | 1 |
| BL-7 | 4 | 4 | 4/5 | 4 | 3 | 4 |
| BL-8 | 4 | 3/4 | 4 | 4 | 3 | 4 |
| BL-9 | 4/5 | 5 | 4 | 4 | 3 | 4 |

Fat bloom measurements after 1 week

| | 13° C. | 20° C. | 25° C. |
|---|---|---|---|
| BL-6 | 5 | 5 | 3 |
| BL-7 | 5 | 5 | 5 |
| BL-8 | 5 | 5 | 5 |
| BL-9 | 5 | 5 | 5 |

Fat bloom measurements after 3 months

| | 13° C. | 20° C. | 25° C. |
|---|---|---|---|
| BL-6 | 5 | 1 | 1 |
| BL-7 | 5 | 5 | 4 |
| BL-8 | 5 | 4 | 5 |
| BL-9 | 5 | 4 | 4 |

Scale:
5 = very good
1 = very poor 7.3 In a comparative example the fat phase consisted of a 60:40 mixture of palm oil olein and hardened palm oil. The results were comparable with these of BL-6.

7.4 It was further found that the dough properties in terms of homogenity and elasticity were improved when fat component C was present (so: blend 9), compared with blends, wherein C was absent (blends 7 and 8).

EXAMPLE 8

| Filling Recipe: | |
|---|---|
| Skimmed milk powder: | 19 |
| Icing sugar: | 37 |
| Cocoa powder 10/12: | 4 |
| Fat: | 40.8 |
| Lecithin: | 0.2 |

| Fat Blend | Fat A (H2M + M2H) | Fat B | Fat C |
|---|---|---|---|
| 1 | 60 | — | 40 |
| Ref | hardened coconut oil | | |

Blend 1
Fat A = Oleine fraction from interesterified mixture of hardened palm oil and hardened palmkernel oil.
$C_{42}:C_{36}$ = 1.3
H2M + M2H = 51.0
$(C_{40} - C_{46})$: 1.06
$(C_{30} - C_{38})$ =
Fat C = Hardened palm oleine fraction
N20 = 73

Reference
Hardened coconut oil to slip melting pt = 32° C.
$C_{42}:C_{36}$ = 0.5
H3M + M2H = 17.4 (not rich in H2M + M2H)
$(C_{40} - C_{46})$: 0.3 (outside claim)
$(C_{30} - C_{38})$ =
N20 = 55
$U_2S + U_3$ >35

Fillings made according to recipe with the two blends shown. Standard dark chocolate shells were filled and then backed off.
40 The samples were then placed on storage.

Results after 3 months storage

| | Bloom Score of shells | |
|---|---|---|
| Blend | 20° C. | 23° C. |
| 1 | 5 | 5 |
| Ref | 2/3 | 1 |

Score: 5 - no bloom, 3 - acceptable, 1 - completely bloomed

| Filling Recipe: | |
|---|---|
| Skimmed milk powder: | 11.6 |
| Icing sugar: | 45 |
| Cocoa powder 10/12: | 3 |
| Fat: | 40 |
| Lecithin: | 0.4 |

| Fat Blend | Fat A (H2M + M2H) | Fat B | Fat C |
|---|---|---|---|
| 1 | 20 | 60 | 20 |
| Ref | palm oleine hardened to a slip melting pt of 33° C. | | |

Blend 1
Fat A = interesterified mixture of hardened palm oil and hardened palmkernel oil.
$C_{42}:C_{36}$ = 2.5
H2M + M2H = 65
$(C_{40} - C_{46})$: 2.8
$(C_{30} - C_{38})$ =
Fat B = Oleine fraction from palm oil
$U_2S + U_3$ 75
Fat C = mid fraction from palm oil
N20 = 80

Reference
Hardened palm oleine fraction
N20 = 22
No H2M + M2H, ie trace amounts only Fillings made according to recipe with the two blends shown. Standard dark chocolate shells were filled and then backed off. The samples were then placed on storage.

Results after 3 months storage

| | Bloom Score of shells | |
|---|---|---|
| Blend | 20° C. | 23° C. |
| 1 | 5 | 3/4 |
| Ref | 1 | 1 |

Score: 5 - no bloom, 3 - acceptable, 1 - completely bloomed

EXAMPLE 10

| Filling Recipe: | |
|---|---|
| Skimmed milk powder: | 11.6 |
| Icing sugar: | 45 |
| Cocoa powder 10/12: | 3 |
| Fat: | 40 |
| Lecithin: | 0.4 |

| Fat Blend | Fat A (H2M + M2H) | Fat B | Fat C |
|---|---|---|---|
| 1 | 20 | 32 | 48 |
| 2 | 30 | 18 | 52 |
| Ref | mixture of 60% palm mid fraction and 40% palm oleine | | |

Blend 1
Fat A = mid fraction from an interesterified mixture of hardened palm oil and hardened palmkernel oil.
$C_{42}:C_{36}$ = 5.9
H2M + M2H = 82
$(C_{40} - C_{46})$: 7.6
$(C_{30} - C_{38})$ =
Fat B = Oleine fraction from palm oil -continued

| | | |
|---|---|---|
| | U2S + U3 | 75 |
| Fat C = | mid fraction from palm oil | |
| | N20 = | 80 |

Blend 2

| | |
|---|---|
| Fat A = | interesterified mixture of hardened palm oil and hardened palmkernel oil. |
| | $C_{42}:C_{36} =$ 2.5 |
| | $H_2M + M_2H =$ 65 |
| | $(C_{40} - C_{46})$: 2.8 |
| | $(C_{30} - C_{38}) =$ |
| Fat B = | Oleine fraction from palm oil |
| | U2S + U3  75 |
| Fat C = | mid fraction from palm oil |
| | N20 = 80 |

Reference

| | |
|---|---|
| | mixture of 60% palm midfraction and 40% palm oleine |
| $H_2M + M_2H =$ | trace only |
| $U_2S + U_3 =$ | 18 |

Fillings made according to recipe with the two blends shown. Standard dark chocolate shells were filled and then backed off. The samples were then placed on storage.

Results after 3 months storage

| | Bloom Score of shells | |
|---|---|---|
| Blend | 20° C. | 23° C. |
| 1 | 5 | 4 |
| 2 | 5 | 4 |
| Ref | 2 | 1 |

Score: 5 - no bloom, 3 - acceptable, 1 - completely bloomed

EXAMPLE 11

| Filling Recipe: | |
|---|---|
| Peanut pate: | 15 |
| Skimmed milk powder: | 6.5 |
| Icing sugar: | 45 |
| Cocoa powder 10/12: | 3 |
| Fat: | 30 |
| Lecithin: | 0.4 |
| Salt: | 0.1 |

| Fat Blend | Fat A (H2M + M2H) | Fat B | Fat C |
|---|---|---|---|
| 1 | 20 | — | 80 |
| 2 | 30 | 14 | 56 |
| Ref | mixture of 35% groundnut oil plus 65% soya bean oil hardened to a slip melting pt of 34° C. | | |

Blend 1

| | |
|---|---|
| Fat A = | mid fraction from an interesterified mixture of hardened palm oil and hardened palmkernel oil. |
| | $C_{42}:C_{36} =$ 6.4 |
| | $H_2M + M_2H =$ 73 |
| | $(C_{40} - C_{46})$: 8.3 |
| | $(C_{30} - C_{38}) =$ |
| Fat C = | mid fraction from palm oil |
| | N20 = 80 |

Blend 2

| | |
|---|---|
| Fat A = | interesterified mixture of hardened palm oil and hardened palmkernel oil. |
| | $C_{42}:C_{36} =$ 5.9 |
| | $H_2M + M_2H =$ 82 |
| | $(C_{40} - C_{46})$: 7.6 |
| | $(C_{30} - C_{38}) =$ |
| Fat B = | Oleine fraction from palm oil |
| | U2S + U3  75 |
| Fat C = | mid fraction from palm oil |
| | N20 = 80 |

Reference

| | |
|---|---|
| | Hardened mixture of groundnut oil and soya bean oil |
| N20 = | 66 |
| No $H_2M + M_2H$, ie trace amounts only | |

Fillings made according to recipe with the two blends shown. Standard dark chocolate shells were filled and then backed off. The samples were then placed on storage.

Results after 3 months storage

| | Bloom Score of shells | |
|---|---|---|
| Blend | 20° C. | 23° C. |
| 1 | 5 | 5 |
| 2 | 5 | 5 |
| Ref | 2 | 1 |

Score: 5 - no bloom, 3 - acceptable, 1 - completely bloomed

EXAMPLE 12

The following dark chocolate recipe was used for evaluation of the fat blends:

| Recipe used: | |
|---|---|
| CCB | 9% |
| CCM | 36% |
| sugar | 50% |
| lecithin | 0.4% |
| test fat (1–4) | 5% |

The fat blends used were:

| | sample | | | |
|---|---|---|---|---|
| | 1 ref | 2 | 3 | 4 |
| blend | 40% A 60% C | 40% A 20% B' 40% C | 40% A 20% B'' 40% C | 40% A 20% B''' 40% C |

A = a mid fraction of an ($H_2M + M_2H$) fat (cf. example 4).
Fat B = a liquid oil, selected from
B' = wet fractionated palm oil olein
B'' = high oleic sunflower oil
B''' = soybean oil
C = the blend of illipe, shea stearin and palm oil mid, which is part of fat II of example 5.

Storage evaluation results—3 months at 13°, 20° and 25° C.

| | sample | | | |
|---|---|---|---|---|
| | 1 | 2 | 3 | 4 |
| 13° C. | bloom (1 week) | no bloom | no bloom | no bloom |
| 20° C. | bloom (1 week) | no bloom | no bloom | no bloom |
| 25° C. | no bloom | no bloom | no bloom | no bloom |

Unstabilised N20 of fat C = 49.7
Fat B ($U_2S + U_3$): B' = 72; B'' = 97; B''' = 93

EXAMPLE 13

The following dark chocolate recipe was used for evaluation of the fat blends:

| | |
|---|---|
| CCB | 9% |
| CCM | 36% |
| sugar | 50% |
| lecithin | 0.4% |

-continued

| | test fat | 5% |
|---|---|---|

The fat blends used were:

| | sample | |
|---|---|---|
| | 1 ref | 2 |
| blend | 100% C | 35% A |
| | | 20% B |
| | | 45% C |

A = H$_2$M-type fat with the following composition: $C_{12} = 20.1$; $C_{14} = 8.1$; $C_{16} = 23.7$; $C_{18:0} = 44.3$; $C_{30}$-$C_{38} = 6.3$; $C_{40}$-$C_{46} = 52.6$
Ratio $C_{40}$-$C_{46}/C_{30}$-$C_{38} = 8.34$
B = olein fraction from the wet fractionation of palm oil.
C = same as in example 12

Storage evaluation results—8 months at 20° and 15°/25° C.

| | sample | |
|---|---|---|
| | 1 | 2 |
| 20° C. | no bloom | no bloom |
| 15/25° C. | bloom after 2 months | no bloom |

Unstabilised N$_{20}$ for fat C=49.7

EXAMPLE 14

The following recipe was used to evaluated the fat blends:

| sugar | 43% |
|---|---|
| FCMP | 10% |
| SMP | 8% |
| CCM | 14% |
| test fat | 25% |
| lecithin | 0.4% |

The fat blends were:

| | sample | |
|---|---|---|
| | 1 ref | 2 |
| blend | 100% C | 7% A |
| | | 4% B |
| | | 89% C |

A = H$_2$M-type fat with the following composition: $C_{12} = 20.1$; $C_{14} = 8.1$; $C_{16} = 23.7$; $C_{18:0} = 44.3$; $C_{30}$-$C_{38} = 6.3$; $C_{40}$-$C_{46} = 52.6$
Ratio $C_{40}$-$C_{46}/C_{30}$-$C_{38} = 8.34$
B = olein fraction from the wet fractionation of palm oil.
C = same as in example 12

Storage evaluation results—3 months at 20° and 20°/32° C.

| | sample | |
|---|---|---|
| | 1 ref | 2 |
| 20° C. | no bloom | no bloom |
| 20/32° C. | bloom after 1.5 months | no bloom |

Unstabilised N$_{20}$ for fat C=49.7

EXAMPLE 15

The following recipe was used to evaluate the fat blends:

| sugar | 43% |
|---|---|
| FCMP | 10% |
| SMP | 8% |
| CCM | 14% |
| test fat | 25% |
| lecithin | 0.4% |

The fat blends were:

| | sample | |
|---|---|---|
| | 1 ref | 2 |
| blend | 100% C | 7% A |
| | 6% B | |
| | 87% C | |

A = H$_2$M-type with the following composition: $C_{12} = 20.1$; $C_{14} = 8.1$; $C_{16} = 23.7$; $C_{18:0} = 44.3$; $C_{30}$-$C_{38} = 6.3$; $C_{40}$-$C_{46} = 52.6$
Ratio $C_{40}$-$C_{46}/C_{30}$-$C_{38} = 8.34$
B = olein fraction from the dry fractionation of palm oil with about 63% (U$_2$S + U$_3$)
C = a blend of 70% PO-mid and 30% shea-stearin Storage evaluation results—3 months at 20° and 20°/32° C.

| | sample | |
|---|---|---|
| | 1 ref | 2 |
| 20° C. | no bloom | no bloom |
| 20/32° C. | bloom after 1 week | bloom after 1 month |

Unstabilised N$_{20}$ for fat C=31

We claim:

1. Blend of triglyceride compositions A, B and C comprising:
   5–80 wt. % of A;
   10–80 wt. % of B:
   0–70 wt. % of C,
   wherein
   A is a triglyceride composition of the (H$_2$M+M$_2$H)-type, H being saturated fatty acid having at least 16 C-atoms, M being saturated fatty acid having 8–14 C-atoms, while the weight ratio of components having 40–46 C-atoms: components having 30–38 C-atoms so $$\frac{C_{40}-C_{46}}{C_{30}-C_{38}}$$

in A=1–20,
   B is a soft triglyceride composition having a content of (U$_3$ +U$_2$S)-triglycerides of at least 45 wt. %, and
   C is a triglyceride composition having a SUS content of at least 45 wt. %,
   wherein
   U=cis- or trans-, mono- or polyunsaturated fatty acid having at least 18 C-atoms, and
   S=saturated fatty acid having 16–22 C-atoms, said composition having an increased resistance to bloom when tempered and molded in the presence of fat C containing SUS.

2. Blend of triglycerides according to claim 1, wherein A is an (H$_2$M+M$_2$H)-type composition as obtainable from the interesterification of a vegetable oil high in triglycerides with fatty acid residues having at least 16 C-atoms and a triglycedride rich in lauric acid residues, myristic acid residues or mixtures thereof.

3. Blend according to claim 2, wherein A is derived from hardened palm oil and hardened palm kernel oil.

4. Blend according to claim 1, wherein B is selected from the group consisting of: 1) vegetable oils liquid at ambient temperature, 2) olein fractions from vegetable oils or butterfat or mixtures thereof and 3) high-stability oils.

5. Blend according to claim 4, wherein B is an olein fraction from the fractionation of palm oil.

6. Blend according to claim 1, wherein C is selected from the group consisting of cocoa butter, shea stearin, palm oil mid-fraction, illipe and fractions of cocoa butter, or mixtures thereof.

7. Blend according to claim 6, wherein C has a content of trisaturated triglycerides of less than 5 wt. %.

8. Chocolate composition comprising a fat component, wherein the fat component comprises 1–25 wt. % of the blend according to claim 1.

9. Chocolate composition according to claim 8, wherein the chocolate is a dark chocolate.

10. Chocolate bars or chocolate-coated confectionery products, wherein the chocolate composition comprises an amount of the blend according to claim 1.

11. Blend of triglyceride compositions A, B and C comprising:
2–40 wt. % of A;
0.5–40 wt. % of B;
60–97.5 wt. % of C,
and wherein
A is a triglyceride composition of the $(H_2M+M_2H)$-type, H being saturated fatty acid having at least 16 C-atoms, M being saturated fatty acid having 8–14 C-atoms, while the weight ratio of components having 40–46 C-atoms: components having 30–38 C-atoms
(so $$\frac{C_{40}-C_{46})}{C_{30}-C_{38}}$$

in A=1–20,
B is a soft triglyceride composition having a content of $(U_3+U_2S)$-triglycerides of at least 30 wt. %, and
C is a triglyceride composition having a SUS content of at least 30 wt. %,
wherein
U=cis- or trans-, mono- or polyunsaturated fatty acid having at least 18 C-atoms, and
S=saturated fatty acid having 16–22 C-atoms said composition having an increased resistance to bloom when tempered and molded in the presence of fat C containing SUS.

12. Blend of triglycerides according to claim 11 wherein A is an $(H_2M+M_2H)$-type composition as obtainable from the interesterification of a vegetable oil high in triglycerides with fatty acid residues having at least 16 C-atoms and a triglyceride rich in lauric acid residues, myristic acid residues or mixtures thereof.

13. Blend according to claim 12, wherein A is derived from hardened palm oil and hardened palm kernel oil.

14. Blend according to claim 11, wherein B is selected from the group consisting of: 1) vegetable oils liquid at ambient temperature, 2) olein fractions from vegetable oils or butterfat or mixtures thereof and 3) high-stability oils.

15. Blend according to claim 14, wherein B is an olein fraction from the fractionation of palm oil.

16. Blend according to claim 11, wherein C is selected from the group consisting of cocoa butter, shea stearin, palm oil mid-fraction, illipe and fractions of cocoa butter, or mixtures thereof.

17. Blend according to claim 11, wherein C has a content of trisaturated triglycerides of less than 5 wt. %.

18. Chocolate-like composition low in cocoa butter comprising a fat component, wherein the fat component comprises 5–100 wt. % of the blend according to claim 11.

19. Bars or coated confectionery products, wherein the composition comprises an amount of the blend according to claim 11.

20. Fat composition suitable for the preparation of non-blooming chocolate-coated, baked bakery dough products comprising fat A and at least one of fat B and fat C, wherein:
fat A=fat rich in $(H_2M+M_2M)$ triglycerides, H=saturated fatty acid having $\geq C_{16}$, M=saturated fatty acid having $C_8-C_{14}$,
fat B=fat containing at least 35 wt. % $(U_3+U_2S)$, U=mono- or polyunsaturated fatty acid having $\geq C_{18}$, S=saturated fatty acid having $\geq C_{16}$,
fat C=vegetable fat or a fraction thereof, displaying an $N_{20}$ (non-stab.) of more than 15,
fat A being present in amounts of 5.5–95 wt. %,
fat B being present in amounts of 30–94.5 wt. %,
fat C being present in amounts of 5–94.5 wt. %, the amount of (B+C) being always more than 0% and the combination of 75 wt. % of wet-fractionated palm oil olein (as fat B) and 25 wt. % of a fat A having 70 wt. % of $(M_2H+MR)$ being excluded, said composition having an increased resistance to bloom when tempered and molded in the presence of fat C containing SUS.

21. Fat composition according to claim 20, wherein fat A is selected from the group consisting of:
a) interesterified mixture of vegetable oil high in triglycerides with fatty acid residues having at least 16 C atoms and vegetable triglycerides rich in lauric acid residues, myristic acid residues or mixtures thereof;
b) stearin fractions of the fractionation of fats a) above;
c) mid-fractions of the fractionation of fats a) above;
d) olein fractions of the fractionation of fats a) above; and
e) mixtures of fractions a, b, c and/or d above.

22. Fat composition according to claim 21, wherein fat A is an interesterified mixture according to a) wherein the weight ratio of triglycerides with 42 C atoms: triglycerides with 36 C atoms $(C=C_{42}/C_{36})$ is 2.0–5.0.

23. Fat composition according to claim 21, wherein fat A is a stearin fraction according to b) wherein $C_{42}:C_{36}$ is more than 7.0.

24. Fat composition according to claim 21, wherein fat A is a mid-fraction according to c) wherein $C_{42}:C_{36}$ is 5.0–7.0.

25. Fat composition according to claim 21, wherein fat A is an olein fraction according to d) wherein $C_{42}:C_{36}$ is less than 2.0.

26. Fat composition according to claim 20, wherein fat A has an $(H_2M+M_2H)$ content of 20–100 wt. %.

27. Fat composition according to claim 20, wherein the weight ratio of triglycerides with 40–46 C-atoms to triglycerides with 30–38 C atoms (so:

$$\frac{C_{40}-C_{46})}{C_{30}-C_{38}}$$

is between 0.8 and 15.

28. Fat composition according to claim 20, wherein fat B is a liquid oil selected from the group consisting of sunflower oil, rapeseed oil, soybean oil, arachidic oil, palm oil olein, high oleic sunflower oil, high oleic rapeseed oil, with a ($U_2S+U_3$) content of more than 45 wt. %.

29. Fat composition according to claim 20, wherein fat C is a hardened vegetable fat or a fraction thereof with a melting point of 25–55° C. selected from the group consisting of hardened palm oil olein-37, hardened palm oil-44, hardened soybean-36, a mid-fraction of a hardened mixture of soybean oil and cottonseed oil.

30. Fat composition according to claim 20, wherein fact C is a fraction of unhardened vegetable oils, which fraction has a SUS content of more than 35 wt. %.

31. Fat composition according to claim 20, wherein fat C is palm oil stearin.

32. Fat composition according to claim 20, wherein fat C displays an $N_{20}$ (non-stab.) of more than 25.

33. Fat composition according to claim 20, wherein the fat blend displays an $N_{20}$ (non-stab.)=15–55 and an $N_{30}$ (non-stab.)=2–30.

34. Water-in-oil emulsions containing 20–85 wt. % of fat, wherein the fat is a fat composition according to claim 20.

35. Baked bakery products, at least partly coated with a chocolate or chocolate-like material, wherein the fat phase of the dough from which the baked product is made at least partly consists of the fat composition according to claim 20.

36. Baked products according to claim 35, wherein the ($H_2M+M_2H$) level of the fat phase of the dough phase of the baked product is 5–80 wt. %.

37. Baked products according to claim 36, wherein the baked product is a biscuit, a cookie or a cake, which is at least partly coated with a chocolate or chocolate-like layer.

38. Fat composition comprising fats A and C or A, B and C, wherein:
fat A=fat rich in ($H_2M+M_2H$) triglycerides, H=saturated fatty acid having $\geq C_{16}$, M=saturated fatty acid having $C_8-C_{14}$,
fat B=fat containing at least 35 wt. % ($U_3+U_2S$), U=mono- or polyunsaturated fatty acid having $\geq C_{18}$, S=saturated fatty acid having $\geq C_{16}$,
fat C=vegetable fat or a fraction thereof, displaying an $N_{20}$ (non-stab.) of more than 15,
fat A being present in amounts of 5.5–95 wt. %,
fat B being present in amounts of 0–89.5 wt. %, and
fat C being present in amounts of 5–94.5 wt. %, said composition having an increased resistance to bloom when tempered and molded in the presence of fat C containing SUS.

39. Fat composition according to claim 38, wherein fat A is selected from the group consisting of:
a) interesterified mixture of vegetable oil high in triglycerides with fatty acid residues having at least 16 C atoms and vegetable triglycerides rich in lauric acid residues, myristic acid residues or mixtures thereof;
b) stearin fractions of the fractionation of fats a) above;
c) mid-fractions of the fractionation of fats a) above;
d) olein fractions of the fractionation of fats a) above; and
e) mixtures of fractions a, b, c and/or d above.

40. Fat composition according to claim 39, wherein fat A is an interesterified mixture according to a) wherein the weight ratio of triglycerides with 42 C atoms: triglycerides with 36 C atoms ($C=C_{42}/C_{36}$) is 2.0–5.0.

41. Fat composition according to claim 39, wherein fat A is a stearin fraction according to b) wherein $C_{42}:C_{36}$ is more than 7.0.

42. Fat composition according to claim 39, wherein fat A is a mid-fraction according to c) wherein $C_{42}:C_{36}$ is 5.0–7.0.

43. Fat composition according to claim 39, wherein fat A is an olein fraction according to d) wherein $C_{42}:C_{36}$ is less than 2.0.

44. Fat composition according to claim 38, wherein fat A has an ($H_2M+M_2H$) content of 20–100 wt. %.

45. Fat composition according to claim 38, wherein the weight ratio of triglycerides with 40–46 C-atoms to triglycerides with 30–38 C atoms (so:

$$\frac{C_{40}-C_{46})}{C_{30}-C_{38}}$$

is between 0.8 and 15.

46. Fat composition according to claim 38, wherein fat B is a liquid oil selected from the group consisting of sunflower oil, rapeseed oil, soybean oil, arachidic oil, palm oil olein, high oleic sunflower oil, high oleic rapeseed oil, with a ($U_2S+U_3$) content of more than 45 wt. %.

47. Fat composition according to claim 38, wherein fat C is hardened vegetable fat or a fraction thereof with a melting point of 25°–55° C. selected from the group consisting of hardened palm oil olein-37, hardened palm oil-44, hardened soybean-36, a mid-fraction of a hardened mixture of soybean oil and cottonseed oil.

48. Fat composition according to claim 38, wherein fat C is a fraction of unhardened vegetable oils, which fraction has a SUS content of more than 35 wt. %.

49. Fat composition according to claim 38, wherein fat C displays an $N_{20}$ (non-stab.) of more than 25.

50. Fat composition according to claim 38, wherein the fat blend displays an $N_{20}$ (non-stab.)=10–75.

51. Confection product comprising a chocolate or chocolate-like outer coating completely or partially covering a filling comprising a fat composition according to claim 38.

* * * * *